United States Patent
Chang et al.

(10) Patent No.: US 9,958,572 B2
(45) Date of Patent: May 1, 2018

(54) SYNTHETIC TEST BEDS FOR FRACTURING OPTIMIZATION AND METHODS OF MANUFACTURE AND USE THEREOF

(71) Applicant: Halliburton Energy Services, Inc., Houston, TX (US)

(72) Inventors: Andy Cheng Chang, Houston, TX (US); Syed Muhammad Farrukh Hamza, Houston, TX (US); Matthew Lewis Lahman, Houston, TX (US); Jesse Clay Hampton, Conroe, TX (US); Ruixiang Gu, Kingwood, TX (US); Stephen Byrne Persac, Shreveport, LA (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 253 days.

(21) Appl. No.: 14/674,114

(22) Filed: Mar. 31, 2015

(65) Prior Publication Data
US 2016/0291202 A1    Oct. 6, 2016

(51) Int. Cl.
  *G01V 99/00* (2009.01)
  *G01L 1/24* (2006.01)
  *G01B 11/16* (2006.01)

(52) U.S. Cl.
  CPC .......... *G01V 99/005* (2013.01); *G01B 11/168* (2013.01); *G01L 1/24* (2013.01); *G01V 99/00* (2013.01)

(58) Field of Classification Search
  CPC .......... G01B 11/168; G01L 1/24; G01V 99/00; G01V 99/005; G01V 2210/1234; G01V 2210/646; E21B 43/267; E21B 49/008
  USPC ........ 73/37, 432.1, 784, 800, 818, 821, 838, 73/840, 865, 866
  See application file for complete search history.

(56) References Cited

U.S. PATENT DOCUMENTS

| | | | | |
|---|---|---|---|---|
| 4,344,485 | A * | 8/1982 | Butler | E21B 43/2405 166/265 |
| 2002/0013687 | A1* | 1/2002 | Ortoleva | E21B 41/0064 703/10 |
| 2005/0171751 | A1* | 8/2005 | Siebrits | E21B 43/26 703/10 |
| 2009/0192714 | A1* | 7/2009 | Xue | G01V 3/28 702/7 |
| 2009/0240478 | A1* | 9/2009 | Searles | E21B 49/006 703/2 |
| 2009/0288820 | A1* | 11/2009 | Barron | B01J 13/02 166/249 |
| 2011/0029293 | A1* | 2/2011 | Petty | G06F 17/5009 703/2 |
| 2011/0257944 | A1* | 10/2011 | Du | E21B 43/267 703/2 |

(Continued)

*Primary Examiner* — Randy Gibson
*Assistant Examiner* — Gedeon M Kidanu
(74) *Attorney, Agent, or Firm* — McDermott Will & Emery LLP (57) ABSTRACT

A multi-layer composite synthetic test bed may be used to model fracture propagation and fracture networks. For example, a fracturing fluid may be introduced into a multi-layer composite synthetic test bed at a pressure and a flow rate sufficient to create a fracture network therein. Then, the fracture network may be analyzed to produce synthetic fracture data, which may be used in a fracture model.

17 Claims, 7 Drawing Sheets

(56) References Cited

U.S. PATENT DOCUMENTS

| | | | |
|---|---|---|---|
| 2012/0072188 A1* | 3/2012 | Maerten | G01V 99/005 703/2 |
| 2012/0179444 A1* | 7/2012 | Ganguly | E21B 43/26 703/10 |
| 2012/0250459 A1* | 10/2012 | Sil | G01V 1/50 367/35 |
| 2012/0318500 A1* | 12/2012 | Urbancic | E21B 43/26 166/250.1 |
| 2014/0133273 A1* | 5/2014 | Sil | G01V 1/303 367/36 |
| 2014/0358510 A1* | 12/2014 | Sarkar | G06F 17/5009 703/10 |

\* cited by examiner

SYNTHETIC TEST BEDS FOR FRACTURING OPTIMIZATION AND METHODS OF MANUFACTURE AND USE THEREOF

BACKGROUND

The exemplary embodiments described herein relate to fracturing operations of subterranean formations.

Subterranean formations are often stimulated by hydraulic fracturing operations to enhance the volume of fluid produced from the formation in later production operations. In traditional hydraulic fracturing operations, a fracturing fluid, which may also function simultaneously or subsequently as a carrier fluid, is pumped into a portion of a subterranean formation at a rate and pressure sufficient to create or extend at least one fracture therein. Typically, particulate solids, often referred to as proppant particles, are suspended in a portion of the fracturing fluid or subsequently introduced proppant slurry. The proppant particles fill at least a portion of the fractures to form a proppant pack and serve to prevent the fractures from fully closing once the hydraulic pressure is removed. By keeping the fractures from fully closing, conductive paths are formed through which fluids produced from the formation may flow.

The degree of success of a subsequent production operation depends, at least in part, upon on the design of the fracturing operation and its relative optimization vis-à-vis the particular formation in which it will be placed. Designing the right fracturing operation for a given application often involves modeling many interrelated parameters including materials (e.g., fracturing fluids, proppants, etc.), tools (e.g., zonal isolation devices, etc.), pumping schedules, treatment pressures, fluid rates, fracture mechanics, and the parameters relating to the well bore and the surrounding subterranean formation (e.g., rock type, deviation of the well bore, depth of the zone in the formation to be fractured, etc.) Predicting the outcome and results of a fracturing operation is important to not only maximize production levels for hydrocarbons, but also protect water tables and other surrounding concerns.

To design fracturing methods optimized for the specific interrelated parameters associated with a given job or project, oftentimes researchers create lab scale models mimicking the subterranean formation, rock type, rock mechanics, and other parameters affecting fracturing of subterranean, which are referred to as synthetic test beds (STBs). Using these STBs, researchers can test theories relating to the interrelated parameters involved in the fracturing operation to design a particular fracturing job.

Figure 1:
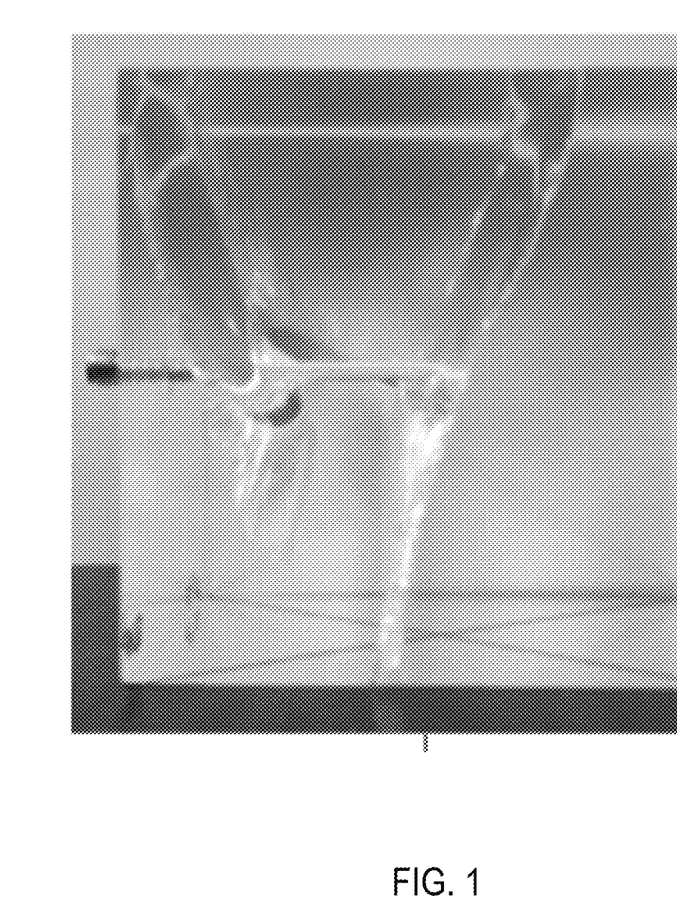
FIG. 1 depicts an example of a monolithic, homogenous STB as described herein.

Standard STBs usually consist of homogenous plastic blocks, e.g., polymethylmethacrylate blocks, like that illustrated in FIG. 1. The STB is placed in a test rig and then fractured using conditions and fluids of interest. Although the clearness of the plastic in the STB enables the observer to observe the fracturing effect of an injected modeled fluid, the monolithic nature and homogeneity of the STBs composition is not representative of actual sedimentary rock. Sedimentary rock is a layered composite structure (e.g., bedding planes), each layer potentially having different characteristics (e.g., rock mechanical properties) that may affect a fracturing operation. Thus, these homogenous plastic STBs are not able to model a fracturing operation sufficiently to optimize fracturing operations. Consequently, observers cannot gain an adequate understanding of the relative effect of changes in the interrelated parameters (e.g., stress interference, rate, viscosity, process order, etc.) that affect the modeled fracturing operations. Additionally, observers are unable to accurately test or create optimized hypotheses from which more predictable fracturing operations result, which is important because of the extra scrutiny placed on fracturing operations.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The exemplary embodiments described herein relate to fracturing operations of subterranean formations, and more particularly, developing in-lab testing methods that utilize a multi-layer composite as a synthetic test bed (also referred to herein as a multi-layer composite synthetic test bed or "MLC-STB"), to model fracture propagation and fracture networks. As used herein, the term "fracture network" refers to one or more fractures, which may be interconnected or not.

Generally, MLC-STB are composite structures of multiple layers of different materials where the material of each layer individually or relative to juxtaposing layers may be chosen to represent the properties of various lithographic layers that may be present in a subterranean formation. That is, the material composition for an individual layer may have properties (itself or relative to juxtaposing layers) that mimic or correlate to the brittleness or other properties of the lithologies in a subterranean formation.

The MLC-STBs may then be fractured in a way that simulates a downhole fracturing operations. The resultant data, also referred to herein as "synthetic fracture data," may include fracture network structure (e.g., the amount of branching of individual fractures), fracture propagation rate, and the like and may be correlated to the properties of the fluid (e.g., viscosity), the fracturing parameters (e.g., pressure and flow rate), the characteristics of a layer or juxtaposing layers of the MLC-STB (e.g., brittleness, relative thickness, and applied compression pressure), and the like. The synthetic fracture data allows researchers to understand the interrelated parameters, especially those associated with rock failure mechanics and fluid flow dynamics, affecting a given fracturing operation to a greater extent than before.

By using a multilayer layer structure, the MLC-STBs of this disclosure better and more accurately mimic subterranean lithologies, so that researchers can visualize fracture propagation behavior more clearly in controlled lab conditions. The synthetic fracture data may be used for predictive modeling (e.g., utilizing software systems and fracture models) of in-field fracture networks. For instance, the MLC-STBs of this disclosure may provide improved modeling of rock failure mechanics associated with a given fracturing operation that may be due to juxtaposing lithologies, which may then result in better predictive data for designing optimized and predictable fracturing operations. The nature of the synthetic fracture data and the fracture models may independently be qualitative or quantitative. That is, the synthetic fracture data may qualitatively describe the fracture network as being bi-wing or multi-oriented and be correlated to the general description of the MLC-STB (e.g., a ductile formation with brittle bounded layers). Then, the qualitative characterization of the synthetic fracture data correlated to the MLC-STB description may be used to optimize the fracture model and field operation (e.g., fluid diverters may be used to divert fluid flow in bi-wing fracture to increase the surface area of fractures). Further, quantitative synthetic fracture data may be used to optimize fracture models that quantitatively predict production decline over time and fracture network reach into the formation. This quantitative information may be used in designing new well locations or re-fracture operations.

Figure 9:
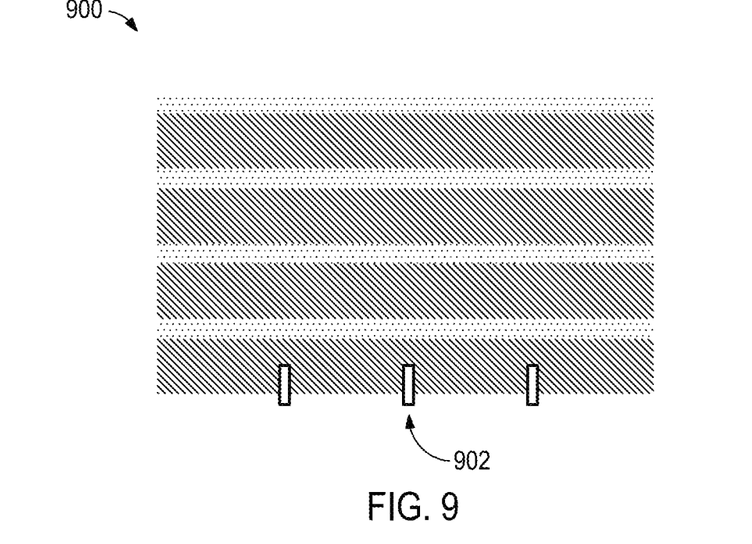
FIG. 9 provides a cross-sectional illustration of a MLC-STB with a hole generally perpendicular to the layers of the MLC-STB.

Synthetic fracture data obtained from fracturing the MLC-STBs, alone or in combination with geomechanical data (e.g., of core samples) and formation visualization data (e.g., seismic, micro-seismic, and logging data of the formation), may be used to design in-field fracturing jobs (e.g., equipment, fluids, pressures, fluid flow rates, etc.), develop new innovative hydraulic fracturing methods with greater certainty and minimal risk, and investigate fracture propagation with a layered lithology (which may be used to develop new or improve existing fracture modeling software). The foregoing applications of the synthetic fracture data may be generic to formations that include a particular lithology (e.g., formations that include a sandstone lithology) or may be customized to a specific well. Further, these applications may be extended from a singular well to horizontal cluster wells where the fracture networks of proximal horizontal wells may interact with each other (e.g., FIG. 9 depicts a MLC-STB suitable for analyzing the fracture networks of multiple, proximal wells). Therefore, the fracture mechanics associated with the fracturing operation of one or more wells may be optimized based on the synthetic fracture data observed in the modeling tests of this disclosure.

In some instances, the MLC-STBs disclosed herein may be designed (e.g., the composition and thickness of juxtaposing layers chosen) based on an identified subterranean formation or portion thereof. Altering the mechanical properties of the materials in a multilayer structure may allow for changing the energy loss as fractures undergo the extension process.

The identified subterranean formation may be one that has been fractured for correlating the synthetic fracture data back to or one that is to be fractured for designing the upcoming fracturing operations. Alternatively, the compositions and thickness of layers of the MLC-STB may be chosen to investigate correlations without a specific subterranean formation in mind.

The MLC-STBs disclosed herein preferably should be designed to mimic properties the rock contained in subterranean formation to allow researchers to observe data regarding relative effects of changes in the interrelated considerations of a given fracturing operation. For example, if shale is of interest, then the MLC-STB disclosed herein may include materials that best mimic the properties of the shale. Generally, the individual layers of the MLC-STB may be formed of a polymeric material that optionally may further include additives. Several different considerations may be taken into account when choosing the materials of construction (MOC) for the layers of an MLC-STB, including, but not limited to: polymeric composition of the MOC, mechanical properties of the MOC (e.g., modulus, ductility, strength, and the like), the effect of any additional optional components included within each layer, compatibility with the fracturing fluid used in conjunction with the MLC-STB, inter-layer adhesion between juxtaposed layers, and transparency relative to the analysis method of the fractures formed in the MLC-STB.

The MOCs used to form the layers of an MLC-STB preferably should have certain mechanical properties similar to a rock lithology. These mechanical properties may include, but are not limited to, hardness, Young's modulus, glass transition temperature ($T_g$), tensile elongation, and melt flow rate. As there are several potential properties of the MOC that may be used to correlate the MOC selection to the rock lithology, an algorithm-based material selection parameter can be used to match the MOCs to a selected rock lithology.

As to hardness, the MOC may have a Brinell Hardness measured by a standard procedure (such as outlined in ASTM D5873) of about 1 or greater, about 2 or greater, about 5 or greater, or about 7 or greater (e.g., about 1 to about 100, including any subsets therebetween). Preferred materials may include, but are not limited to, acrylics (e.g., polymethylmethacrylate (PMMA)), epoxies, polycarbonates (PC), polystyrenes (PS), polyvinylchloride (PVC), cellulose acetates, nylons, cellulose nitrates, and the like. For example, a MOC with a Brinell Hardness of about 10 may be preferred for mimicking shale from the Bossier formation of similar Brinell hardness. Exemplary MOC with corresponding Brinell Hardness are provided in Table 1.

TABLE 1

| Polymer | Brinell Hardness |
| --- | --- |
| poly(methyl methacrylate) | 34 |
| polystyrene | 35 |
| polyvinylchloride | 20 |
| cellulose acetate | 12 |
| polypropylene | 10 |
| nylon | 10 |
| cellulose nitrate | 10 |
| polyethylene | 2 |

Figure 2:
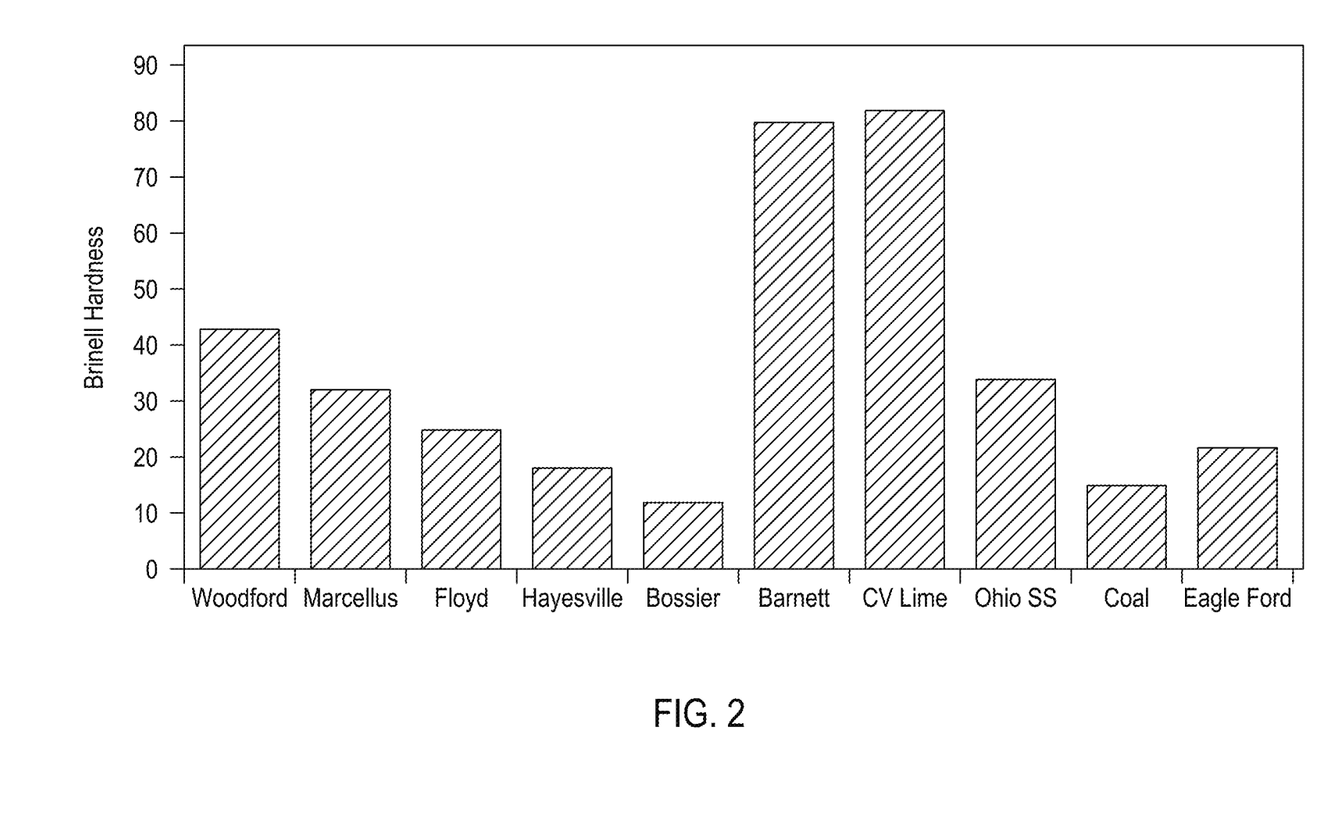
FIG. 2 provides a Brinell Hardness of various subterranean formations.

As described herein, the choice MOC preferably is guided by the characteristics of the rock lithology. FIG. 2 provides a Brinell Hardness of various subterranean formations. Using Table 1 and FIG. 2, polyvinylchloride may be a suitable MOC for at least some of the layers used to mimic the EagleFord Shale.

As to modulus, the Young's modulus of the MOC measured by ASTM E111 may be greater than 500 MPa, greater than 750 MPa, or greater than 1000 MPa (e.g., about 750 MPa to about 20 GPa). In some embodiments, the polymeric material may be combined with at least one other component to increase the modulus. Examples of such modulus increasing materials may include, but are not limited to, fillers, fibers, platelets, another polymer. It is further recognized that it may not always be possible to measure of modulus of different materials using the same method and/or standard due to practical issues (e.g., brittleness, difficult to shape samples to a given geometry, etc.). An unconfined compression test may be used to determine the Young's modulus of a rock sample. Then, the Young's modulus of the rock sample may be used to guide selection of the polymeric material used to mimic the rock sample in the MLC-STB described herein. For example, a MOC with a Young's modulus of about 10,000 MPa may be preferred for mimicking a shale formation.

Generally, the $T_g$ provides an indication of the crystallinity of a polymer where greater $T_g$ indicates increased crystallinity and a more brittle material. The $T_g$ measured by differential scanning calorimetry (DSC) may be about 20° C. or greater, about 40° C. or greater, about 60° C. or greater, about 80° C. or greater, or about 100° C. or greater (e.g., about 20° C. to about 250° C.). For example, a MOC with a $T_g$ of about 100° C. may be preferred for mimicking a shale formation. In some embodiments, temperature of the MLC-STB may be adjusted relative to the $T_g$ to induce more brittle or more ductile behavior of individual layers.

DSC may be performed on a TA Instruments Q1000 DSC equipped with an refrigerated cooling system accessory with the experimental parameters including: using about 3 mg to about 10 mg of a sample, flowing a nitrogen purge gas at 50 mL/min, rapidly heating to 190° C., holding isothermal for 3 minutes in order to remove any previous thermal history, cooling to −90° C. at 10° C./min cooling rate, holding at −90° C. for 3 minutes, and heating to 150° C. at 10° C./min heating rate. The cooling and second heating curves are used to determine the $T_g$ of the sample.

The tensile elongation to break measured by ASTM D638 is preferably about 150% or less, about 100% or less, about 50% or less, or about 25% or less (e.g., 0.5% to about 150%). The tensile elongation provides a measure of the ductility of the material. MOC with higher tensile elongation may be used to mimic more ductile rock lithologies like clay-rich formation, whereas lower tensile elongation MOC may be used to mimic more brittle rock lithologies like shaly-sandstone.

Molecular weight distribution (MWD) is measured by conventional gel permeation chromatography (GPC) per the procedure described by *Handbook of Size Exclusion Chromatography and Related Techniques* (2nd Edition) by Wu, Chi-san, which includes descriptions and literature references contained therein for polymers, instrumentation, calibration, test methods, and procedures. Definition of weight averaged molecular weight (Mw) is included by reference. The polymers used in the MOC of the layers of an MLC-STB may have a Mw of preferably about 100 g/mol to 5,000,000 g/mol, about 200 g/mol to 3,000,000 g/mol, about 300 g/mol to 2,000,000 g/mol, about 400 g/mol to 1,000,000 g/mol, about 500 g/mol to about 5,000 g/mol, about 1,000 g/mol to about 10,000 g/mol, about 10,000 g/mol to about 100,000 g/mol, about 100,000 g/mol to about 1,000,000 g/mol, or about 100,000 g/mol to about 5,000,000 g/mol.

The polymers used in the MOC of the layers of an MLC-STB may be homopolymers, copolymers (i.e., polymers with two monomeric units), terpolymers (i.e., polymers with three monomeric units), and so on, or blends thereof (i.e., a mixture of two or more polymers that create a new material with different physical properties than the two or more polymers individually). The polymers used in the MOC of the layers of an MLC-STB may be thermoplastics or thermosetting resins. Examples of thermoplastics may include, but are not limited to, acrylics (e.g., polymethylmethacrylate or copolymers thereof), polyvinyl chloride (PVC), cellulose derivatives (e.g., cellulose acetate or copolymers thereof, cellophane or copolymers thereof, cellulose nitrate or copolymers thereof), polystyrene, styrene acrylonitrile, polycarbonate, thermoplastic polyurethanes, polypropylene, nylon (e.g., Nylon-6, and Nylon-6,6), copolymers thereof, blends thereof, and other thermoplastic materials having the below described mechanical properties. Examples thermosetting resins may include, but are not limited to, epoxies, phenolics, polyurethanes, melamine, polyimides, cyanate esters, polyesters, copolymers thereof, blends thereof, and other suitable thermoset materials having the below mechanical properties. Examples of other polymeric materials that may be used in accordance with an MLC-STB disclosed herein include, but are not limited to, polyolefins (e.g., polypropylene, polypropylene and polybutylene, ethylene vinyl acetate, ethylene ethyl acrylate, ethylene acrylic acid, ethylene methyl acrylate, ethylene normal butyl acrylate, polyester, etc.), polyethylene naphthalate and isomers thereof, such as 2,6-, 1,4-, 1,5-, 2,7-, and 2,3-polyethylene naphthalate; polyalkylene terephthalates such as polyethylene terephthalate, polybutylene terephthalate, and poly-1,4-cyclohexanedimethylene terephthalate; polyimides such as polyacrylic imides; polyetherimides; styrenic polymers, such as atactic, isotactic and syndiotactic polystyrene, α-methyl-polystyrene, para-methyl-polystyrene; polycarbonates such as bisphenol-A-polycarbonate (PC); poly(meth)acrylates such as poly(isobutyl methacrylate), poly(propyl methacrylate), poly(ethyl methacrylate), poly(methyl methacrylate), poly(butyl acrylate) and poly (methyl acrylate); cellulose derivatives such as ethyl cellulose, cellulose acetate, cellulose propionate, cellulose acetate butyrate, and cellulose nitrate; polyalkylene polymers such as polyethylene, polypropylene, polybutylene, polyisobutylene, and poly(4-methyl)pentene; fluorinated polymers such as perfluoroalkoxy resins, polytetrafluoroethylene, fluorinated ethylene-propylene copolymers, polyvinylidene fluoride, and polychlorotrifluoroethylene; chlorinated polymers such as polydichlorostyrene, polyvinylidene chloride and polyvinylchloride; polysulfones; polyethersulfones; polyacrylonitrile; polyamides; polyvinylacetate; and polyetheramides. The term "(meth)acrylate" is used herein to denote acrylate or methacrylate.

As described above, copolymers, terpolymers, etc. and blends thereof for the foregoing polymers may be suitable as MOC. For example, copolymers may include styrene-acrylonitrile copolymer (SAN), containing between 10 and 50 wt %, preferably between 20 and 40 wt %, acrylonitrile, styrene-ethylene copolymer; and poly(ethylene-1,4-cyclohexylenedimethylene terephthalate) (PETG). In some embodiments, a blend of more than one polymer (e.g., two to four polymers) may be used. In some instances, one of the polymers in the blend may be a compatibilizer to promote adhesion between two materials that would otherwise not adhere or poorly adhere.

In one particular embodiment, the thermoplastic resin may comprise an alpha-olefin interpolymer of ethylene with a comonomer comprising an alkene, such as 1-octene. The ethylene and octene copolymer may be present alone or in combination with another thermoplastic resin, such as ethylene-acrylic acid copolymer. When present together, the weight ratio between the ethylene and octene copolymer and the ethylene-acrylic acid copolymer may range from about 1:10 to about 10:1, such as from about 3:2 to about 2:3. The polymeric resin, such as the ethylene-octene copolymer, may have a crystallinity of less than about 50%, such as less than about 25%. In some embodiments, the crystallinity of the polymer may range from 5 to 35 percent. In other embodiments, the crystallinity may range from 7 to 20 percent. Crystallinity may be measured by any known method including X-ray diffraction, specific gravity, and thermal analysis (e.g., DSC).

In some instances, the MOC of the layers of an MLC-STB may comprise at least one polymer and an additive, which may be referred to herein as a "composite MOC." Additives may be organic materials, inorganic materials, plasticizers, melt stabilizers, crosslinking catalysts, pro-rad additives, processing stabilizers, heat stabilizers, light stabilizers, antioxidants, heat aging stabilizers, whitening agents, antiblocking agents, bonding agents, tackifiers, and viscosity modifiers. The additive may, in some instances, be used to adjust the properties of an MOC. For example, inorganic fibers and/or crosslinkers may be used to enhance the Young's modulus of the MOC. In another example, a plasticizer may be used to decrease the $T_g$ of the polymer so as to decrease the crystallinity and brittleness of the polymer to be able to mimic a particular rock's behavior. In yet another example, tackifiers may increase the enhance inter-layer adhesion between juxtaposing layers of the MLC-STB.

Examples of inorganic materials suitable for forming composites may include, but are not limited to, feldspar, quartz, glass, ceramics (e.g., titania and silica), carbonates (e.g., calcium carbonate and magnesium carbonate), clays (e.g., bentonite, kaolinite, kaolin, and illite), bauxite, pyrite, iron oxide (e.g., hematite and magnetite), and the like, and any combination thereof.

Examples of organic materials suitable for forming composites may include, but are not limited to, kerogens (a mixture of organic chemical compounds that make up a portion of organic matter in sedimentary rock), carbon fibers, carbon black, graphite oxide, graphene, oxidized graphene, carbon nanotubes, and the like, and any combination thereof. Further, the inorganic and organic materials may be the form of particles, rods, fibers, plates, palettes, and the like.

Examples of plasticizers suitable for forming composites may include, but are not limited to, water, phthalates, adipates, sebacates, maleates, benzoates, glycols, glycol ethers, and the like. Mixtures of these may also be suitable. Selection of the plasticizer will depend on the polymer of the MOC.

Additionally, to mimic porosity in a rock lithology, the MOC of the layers of an MLC-STB may include cavities. Including this porosity may enable researches to model and account for fluid leak-off during the fracturing operation. For example, porosity may be mimicked by using a closed-cell foamed layer. This may be achieved with pore forming agents (e.g., chemicals that expand and create cells during extrusion) or by entraining gases in the polymer melt during extrusion.

The thickness of individual layers of the MLC-STB described herein may be about 100 microns to about 100 cm, including subsets therebetween (e.g., about 100 microns to about 1 cm, about 1 mm to about 10 cm, etc.)

The MLC-STBs disclosed herein may be formed by any suitable technique like melt processing, compression molding, solvent-based methods, and combination thereof. In some instances, individual layers may be produced by these methods then laminated or adhered together. Alternatively, multilayer structures (1002 of FIG. 10) may be produced by the foregoing methods.

Generally, melt processing methods utilize a polymer melt, which may include additives described herein, to produce a layer comprising the MOC. Examples of melt processing methods include extrusion, injection molding, co-extrusion, microlayer co-extrusion, and layer-by-layer assembly.

Generally, compression molding methods apply heat and pressure to polymer particulates with other optional additives dispersed therewith or therein while in a mold. The heat and pressure fuse the polymer particles together to form the layer comprising the MOC.

Generally, solvent-based methods utilize a solvent with the polymer and other optional additives therein. The dispersion is then cast or coated onto a surface where after solvent evaporation a layer is formed comprising the MOC. Examples of solvent-based methods include casting and coating.

When forming the multi-layered structure of the MLC-STB disclosed herein, co-extrusion of multiple layers may be a preferred method to form the MLC-STB directly. When forming the multi-layered structure from individual layers, void spaces between the layers should be avoided. If necessary, such voids can be and preferably should be filled using a suitable material. In some embodiments, heating step(s) may be carried out under pressure to fill the void spaces.

It is readily apparent to one of skill in the art how to construct a multi-layer structure, which based on the present disclosure may then be suitable for use as a MLC-STB and in the methods described herein.

As to the design of the layering of the MLC-STBs disclosed herein, in some embodiments, the MLC-STBs disclosed herein may include two types of layers (e.g., a first layer comprising a first MOC and a second layer comprising a second MOC) in an alternating configuration. In other embodiments, the MLC-STBs may be three or more (e.g., five or more, ten or more, etc.) types of layers in any layered configuration. In some instances, a thousand or more types of layers may be included.

Figure 3:
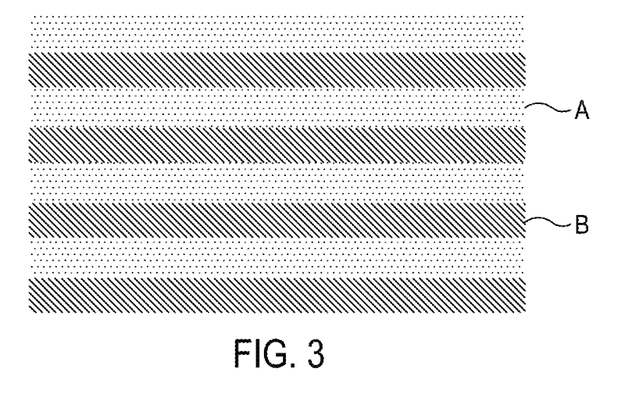
FIG. 3 depicts a cross-section of an alternative A/B layer construction of a MLC-STB of this disclosure.
Figure 4:
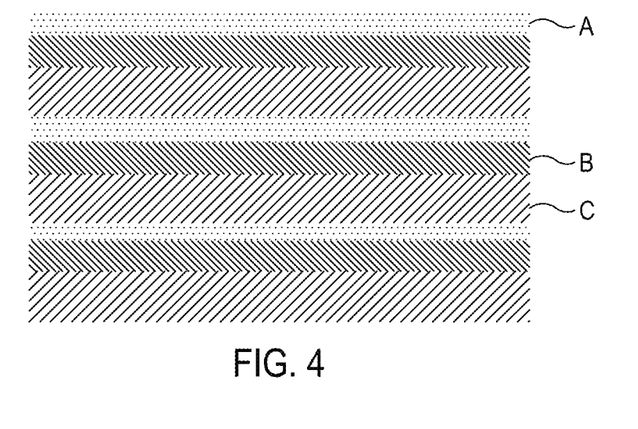
FIG. 4 depicts a cross-section alternating A/B/C layer construction of a MLC-STB of this disclosure.
Figure 5:
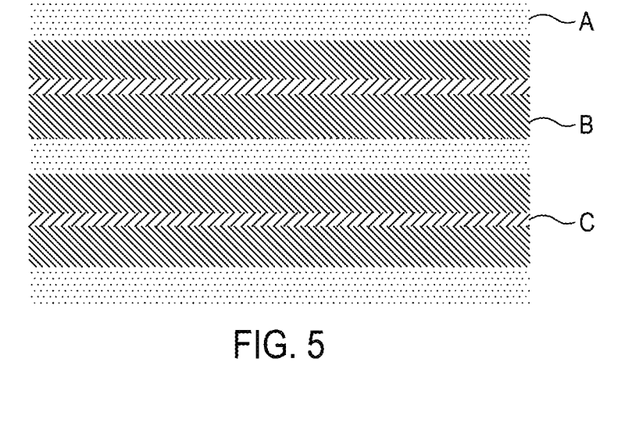
FIG. 5 for example depicts an alternating A/B/C/B layer construction of a MLC-STB of this disclosure.

As an example of a design of the layering of a MLC-STB of this disclosure, FIG. 3 depicts a cross-section of an alternative A/B layer construction of a MLC-STB of this disclosure. As another example of a design configuration of a MLC-STB of this disclosure, FIG. 4 depicts a cross-section alternating A/B/C layer construction of a MLC-STB of this disclosure. As yet another example of a design configuration of a MLC-STB of this disclosure, FIG. 5 for example depicts an alternating A/B/C/B layer construction of a MLC-STB of this disclosure. Being able to design the layers in various orders allow for mimicking various subterranean formations and juxtaposing rock lithologies more accurately. For example, quartz and calcite rock lithologies may be sandwiched between clay-dominant rock lithologies in some subterranean formations, which is akin to FIG. 5.

An additional variation of the MLC-STB and related methods described herein may include inducing a strain or applying a stress to a single layer or multiple layers of the MLC-STB. This strain or stress may result from the method of producing the MLC-STB. For example, individual layers or multiple layers may be strain hardened by known methods. Strain hardening may be achieved by drawing or pulling the MOC during production of the layer where pulling causes the polymer chains to become more aligned, thereby strengthening the MOC. Additionally, a layer may be pulled or drawn during lamination with juxtaposing layers to create or enhance the strain.

Figure 6:
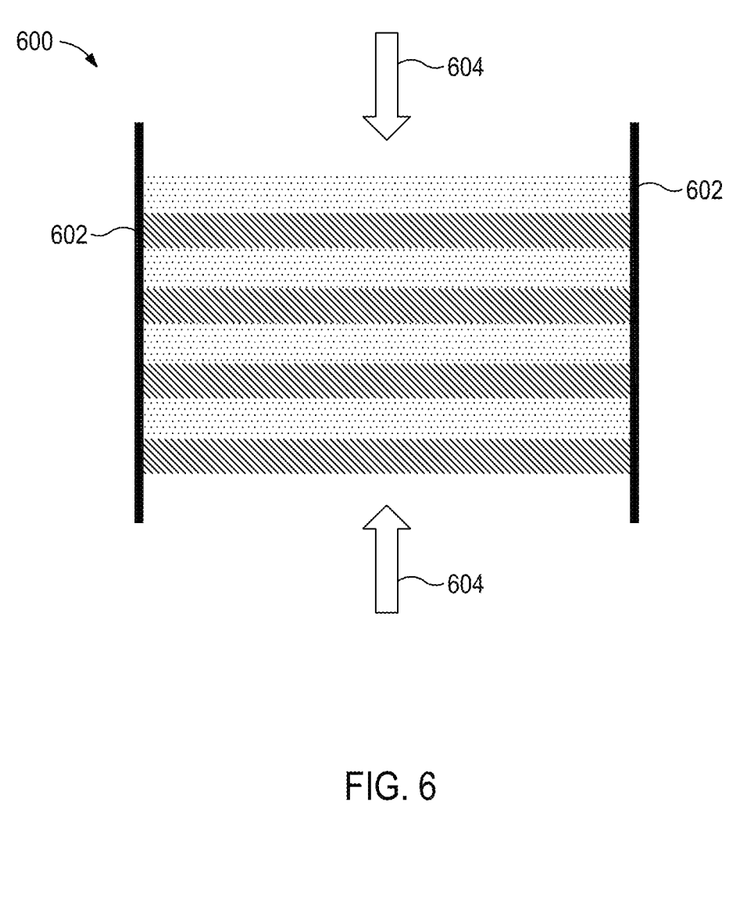
FIG. 6 illustrates a cross-section of a MLC-STB physically confined on four sides with pressure applied at the other two sides.

Additionally, strain or stress may be applied directly to the MLC-STB during the testing. For example, when a material is compressed in one direction, it tends to expand in other directions. However, if the material or MLC-STB is confined in the expansion directions, strain may be induced in the material. Confinement, in some instances, may be physical (e.g., containing the MLC-STB in a container that does not allow for deformation in the expansion directions). For example, FIG. 6 illustrates a cross-section of a MLC-STB 600 physically confined on four sides, only two shown as the illustration is a cross-section, by a physical structure 602 (e.g., a metal containment cylinder or box). Additionally, a pressure 604 is illustrated as being applied to the unconfined top and bottom of the MLC-STB 600.

Figure 7:
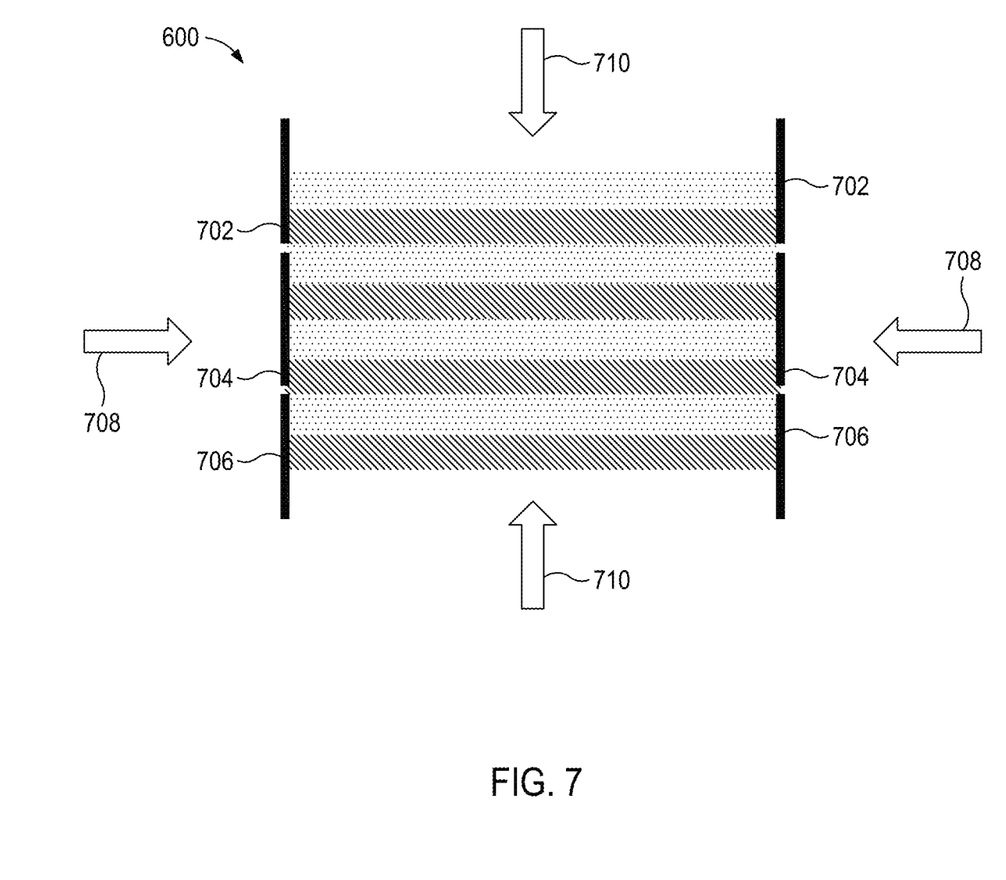
FIG. 7 illustrates a cross-section of a MLC-STB physically confined on four sides with pressure applied at the other two sides as well as two of the four confined sides.

In yet another example, FIG. 7 illustrates a cross-section of a hexahedron MLC-STB 700 physically confined on four sides, only two shown as the illustration is a cross-section, by multiple physical structures 702,704,706 (e.g., metal containment cylinders or boxes). Additionally, a pressure 708 may be applied to one or more of the physical structures, which illustrated as pressure 708 applied to physical structure 704. Additionally, pressure 710 may be applied to the unconfined top and bottom of the MLC-STB 700.

In some instances, confinement may be achieved by juxtaposing layers produced of MOC with different mechanical properties such as Young's modulus and Poisson's ratio.

The applied stress or strain of the foregoing discussion may be useful in mimicking a subterranean formation with an overburden pressure, and horizontal stresses may mimic tectonic forces. In some instances, these stress and strain parameters may be scaled rather than replicate field conditions.

The MLC-STBs disclosed herein may be used in the lab-scale evaluation of fracturing fluids and the design of optimized and predictable fracturing operations. Generally, a MLC-STB described herein is first fractured and then, the produced fracture network (i.e., the collection of fractures, branches, microfractures, etc.) in the MLC-STB is mapped and analyzed to produce synthetic fracture data. The synthetic fracture data may then be correlated to the MLC-STB properties/composition, the fracturing fluid compositions, the fracturing parameters, and the like. In some instances, the resultant synthetic fracture data may then be correlated with actual fracture data of a subterranean formation, also referred to herein as "formation fracture data." In some instances, the synthetic fracture data (optionally having been compared to or correlated with formation fracture data) may be used in mathematical models that design fracturing operations (e.g., fracture models). The foregoing correlations and comparisons may be done manually or with the assistance of a processor (e.g., a computer). Further, such correlations and comparisons may be quantitative or qualitative as described herein.

Figure 8:
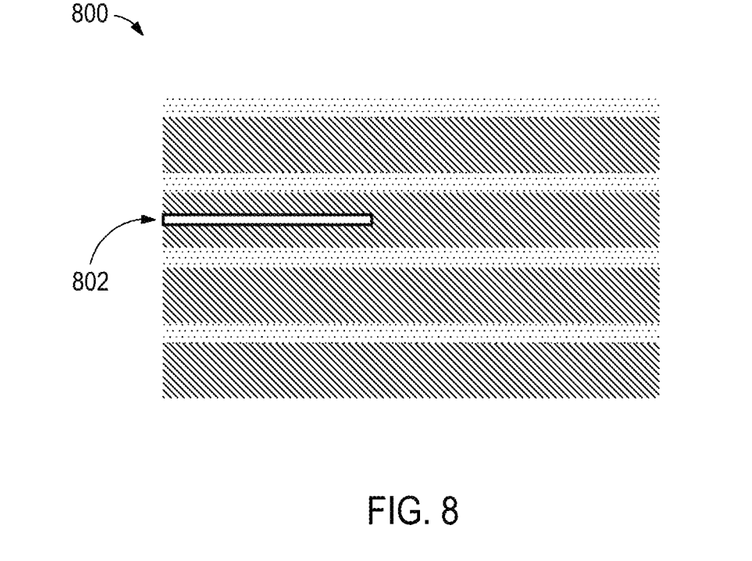
FIG. 8 provides a cross-sectional illustration of a MLC-STB with a hole generally parallel to the layers of the MLC-STB.
Figure 10:
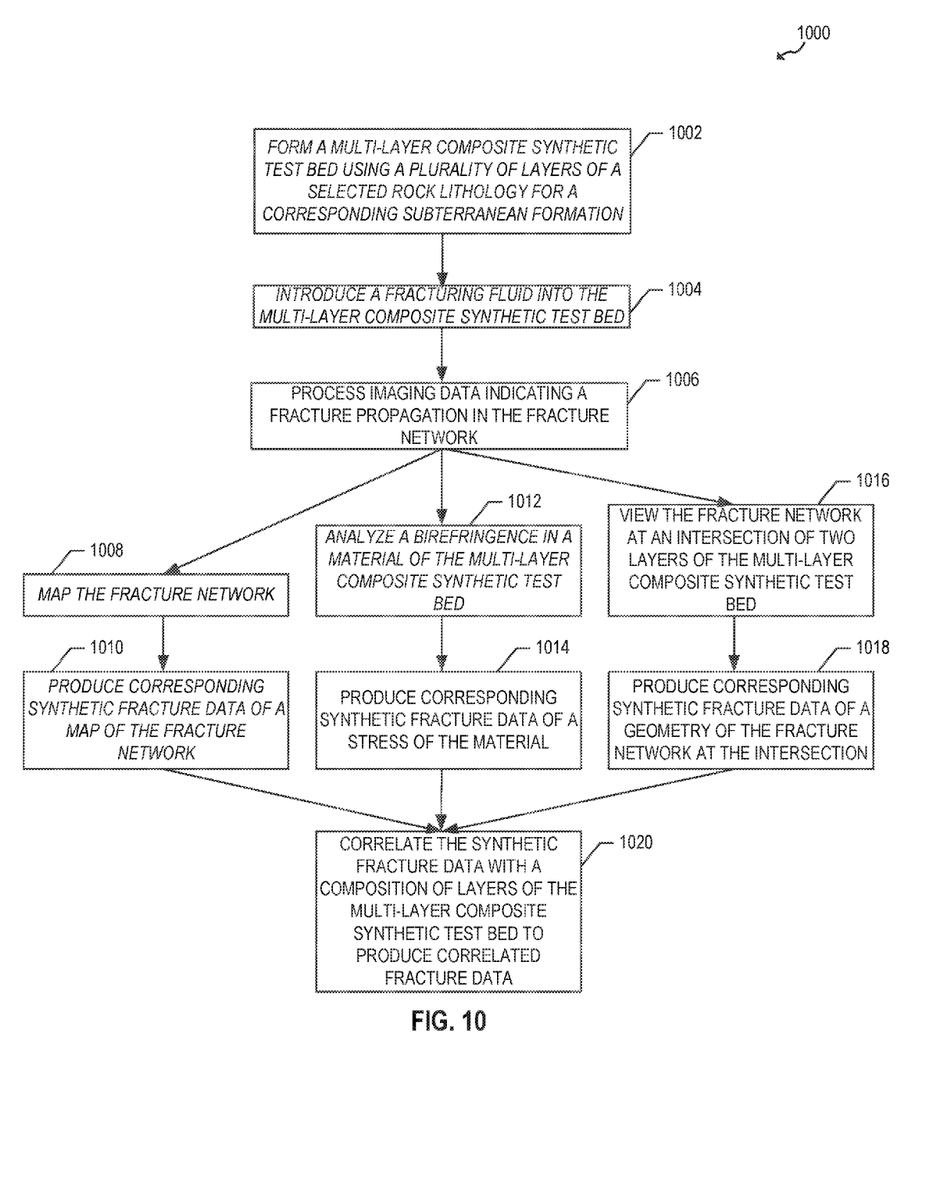
FIG. 10 illustrates a flow chart of an example process of synthetic test beds for fracturing optimization.

When fracturing a MLC-STB, the MLC-STB may have one or more holes drilled therein that mimic a perforation in a wellbore that a fracturing fluid may then be introduced into under pressure to cause the MLC-STB to fracture (1004 of FIG. 10). In some embodiment, multiple wellbores may be used. Referring now to FIG. 8, a cross-sectional illustration of a MLC-STB 800, in some instances, a hole 802 may be generally parallel to the layers of the MLC-STB 800. Referring now to FIG. 9, a cross-sectional illustration of a MLC-STB 900, in some instances, a hole 902 (illustrated with three holes) may be generally perpendicular to the layers of the MLC-STB 900. Angles therebetween may also be implemented.

The holes in the MLC-STB may be connected (e.g., by fittings) to pumps and other equipment (e.g., tubing, valves, clamps, and the like) necessary for introducing the fracturing fluid into the MLC-STB at a rate and pressure sufficient to fracture the MLC-STB.

As described herein, a stress or strain may be applied to the MLC-STB during the foregoing fracturing methods. In some instances, the MLC-STB may be confined (e.g., as illustrated in FIG. 7). In other instances, the MLC-STB may be unconfined. The applied stress or strain may be uniaxial (e.g., as illustrated in FIG. 7), biaxial, triaxial, or polyaxial.

In some instances, the temperature of the MLC-STB may be adjusted to changes the physical properties of the MOC of the layers of the MLC-STB. For example, some MOC can achieve stiffness and fracture behavior similar to natural systems only in subambient temperatures. The temperature of the MLC-STB may, in some instances, be adjusted to about −150° C. or less, about 60° C. or less, or about 20° C. or less.

In some instances, the MLC-STB may be adjusted to superambient temperatures to mimic a subterranean formation. In some embodiments, the temperature of the MLC-STB may be about 20° C. or more, about 60° C. or more, or about 200° C. or more.

Heating and cooling the MLC-STB may be achieved by containing the MLC-STB in a container (not necessarily confining the MLC-STB as described herein) that can heat or cool the MLC-STB and the other components attached thereto and within the container (e.g., an insulated container with a heater and/or cooler). In some instances, the MLC-STB may be preheated or precooled then maintained at temperature in the container for the duration of the fracturing procedure. Adjusting temperature may, in some embodiments, be achieved by oil heaters, cryogenic cooling, and the like.

Generally, the pressures used in fracturing the MLC-STB are scalable to those used in fracturing subterranean formations and may range from about 0 to about 75 MPa.

The methods and systems described herein may be applied to various fracturing procedures, which may include, but are not limited to, multiple wellbore, perforations, zonal isolation devices, cementing, confinement, and combinations thereof.

Various fracturing fluids may be tested including, but not limited to, those that are aqueous-based, oil-based, or combinations thereof. These fluids may be slurries, in some embodiments. In some instances, the fracturing fluids tested may be foamed. In other instances, they may comprise a supercritical fluid, such as supercritical carbon dioxide. One should note that the fracturing fluid should be chosen vis-à-vis the MOCs of the MLC-STB so as to not unduly damage the MLC-STB. Any degradation of the MLC-STB may result in skewing of the observations and synthetic fracture data.

In some embodiments, the fluids may include normal fracturing fluid additives such as proppant. Other examples of additives may include, but are not limited to, salts, weighting agents, emulsifiers, dispersion aids, corrosion inhibitors, emulsion thinners, emulsion thickeners, viscosifying agents, gelling agents, surfactants, foaming agents, gases, pH control additives, breakers, biocides, crosslinkers, stabilizers, chelating agents, scale inhibitors, gas hydrate inhibitors, mutual solvents, oxidizers, reducers, friction reducers, clay stabilizing agents, fibers, and the like, and any combination thereof.

Synthetic fracture data (1010, 1014 and 1018 of FIG. 10) may be collected during the fracturing operation (e.g., time lapsed imaging of fracture propagation (1006 of FIG. 10)) and after the fracturing operation (e.g., a map of the resultant fracture network (1008 of FIG. 10), detailed geometry of the fracture network, and MOC stress values from birefringence (1012 of FIG. 10)).

Mapping a fracture network or imaging fracture propagation may involve visual inspection, especially where the MOC of the layers of the MLC-STB are sufficiently transparent. In some instances, the fracturing fluid may include a contrast agent that allows for visualization of the fracture network by x-ray computed tomography or magnetic resonance imaging. In some instances, acoustic or sonic methods may be used to map the fracture network or image fracture propagation. Additionally, sensors and gauges on or imbedded in MLC-STB may be used for mapping. Combinations of the foregoing methods may also be suitable. For example, mapping methods may utilize acoustic emissions, strain sensing, embedded gauges, and sensors.

In addition to mapping the fracture network, individual portions of the fracture network may be analyzed by various microscopy techniques to view the stresses applied to the MOC surround the fracture network. Such analysis may, in some instances, require dissection of the MLC-STB depending on the analysis technique. For example, polarized light microscopy may be used with some MOC (e.g., PMMA, PC, PS, and the like) where observed birefringence in the MOC could be correlated to stress values in the MOC with the proper calibration). In an exemplary embodiment, a polariscope combined with a digital mapping system may be used to create an image of the distribution of birefringence values. The birefringence may then be correlated to test pieces where known strains and stresses were applied. Additionally, optical microscopy and even electron microscopy may be used for viewing the geometry microfractures, fracture tips, and locations where fracture branch. These stress values from birefringence and detailed geometry of the fracture network, especially at the interface between juxtaposing layers (1016 of FIG. 10)), would provide more detail than existing technologies in understanding fracture propagation through rock lithologies.

The synthetic fracture data may then be correlated to the fracturing parameters (e.g., the MLC-STB composition and temperature, the properties of individual layers of the MLC-STB, and the fracture fluid pressure and flow rate) (1020 of FIG. 10). The correlated data can be used to guide the development of analytical and numerical models (e.g., fracture models) in order to understand and predict conditions that may increase reservoir drainage and avoid pitfalls that may reduce productivity.

The MLC-STB methods and systems described herein allow for collecting actual mechanical data (Young's modulus, Poisson's ratio, tensile strength, fracture toughness, compressive strength etc.), fluid data (rheological properties, temperature, density), fracturing data (width, length, height, stress field), and treatment data (pressure, flow rate, frictional pressure drop). This collection of data may be used to populate equations such as 1D, 2D, pseudo 2D, 3D (planar or nonplanar). Further, the data may be analyzed to investigate fracture geometry, crack mechanism, interactions, stress alteration, and interference and volume calculations. The data may be further related to field conditions by performing scaling calculations for fracture modeling. In some instances, combinations of the foregoing may be implemented.

Embodiments disclosed herein include Embodiment A, Embodiment B, and Embodiment C.

Embodiment A is a method that includes introducing a fracturing fluid into a multi-layer composite synthetic test bed at a pressure and a flow rate sufficient to create a fracture network therein; and analyzing the fracture network to produce synthetic fracture data.

Embodiment B is a method that includes introducing a fracturing fluid into a multi-layer composite synthetic test bed at a pressure and a flow rate sufficient to create a fracture network therein; analyzing the fracture network by at least one of (1), (2), or (3) to produce a corresponding synthetic fracture data of (A), (B), or (C): (1) mapping the fracture network to produce (A) a map of the fracture network; (2) analyzing a birefringence in a material of the multi-layer composite synthetic test bed surrounding at least a portion of the fracture network to produce (B) a stress of the material associated with the birefringence; and (3) viewing at least a portion of the fracture network at an intersection of two layers of the multi-layer composite synthetic test bed to produce (C) a geometry of the portion of the fracture network at the intersection of the two layers; and correlating the synthetic fracture data with a composition of at least some of the layers that comprise the multi-layer composite synthetic test bed to produce correlated fracture data.

Embodiments A and B may have one or more of the following additional elements in any combination: Element 1: the method further including inputting the synthetic fracture data into a fracture model; Element 2: the method further including using the fracture model to design a fracturing operation of a subterranean formation; Element 3: wherein analyzing the fracture network involves mapping the fracture network, and wherein the synthetic fracture data comprises a map of the fracture network; Element 4: wherein analyzing the fracture network involves analyzing a birefringence in a material of the multi-layer composite synthetic test bed surrounding at least a portion of the fracture network, and wherein the synthetic fracture data comprises a stress of the material associated with the birefringence; Element 5: wherein analyzing the fracture network involves viewing at least a portion of the fracture network at an intersection of two layers of the multi-layer composite synthetic test bed, and wherein the synthetic fracture data comprises a geometry of the portion of the fracture network at the intersection of the two layers; Element 6: the method further including designing the layers of the multi-layer composite synthetic test bed based on a rock lithology in a subterranean formation; Element 7: the method further including adjusting a temperature and a pressure of the multi-layer composite synthetic test bed; Element 8: the method further including correlating the synthetic fracture data with a composition of at least some of the layers that comprise the multi-layer composite synthetic test bed to produce correlated fracture data; and Element 9: the method further including Element 8 and inputting the correlated fracture data into the fracture model.

By way of non-limiting example, exemplary combinations applicable to Embodiment A or B include: Element 1 in combination Element 2; Element 2 in combination with Element 3; Element 3 in combination with Element 4; Element 4 in combination with Element 5; Element 5 in combination with Element 6; Element 6 in combination with Element 7; two or more of the foregoing in combination; and Element 8 and optionally Element 9 in combination with at least one of Elements 1-7.

Embodiment C is a system that includes a multi-layer composite synthetic test bed having at least one hole drilled therein, the hole being connected to a pump for introducing a fluid into the multi-layer composite synthetic test bed.

Embodiment C may have one or more of the following additional elements in any combination: Element 10: wherein the at least one hole is parallel to layers of the multi-layer composite synthetic test bed; Element 11: wherein the at least one hole is perpendicular to layers of the multi-layer composite synthetic test bed; Element 12: wherein the multi-layer composite synthetic test bed is a shaped as a hexahedron, and wherein the system further comprises: at least one structure confining four sides of the hexahedron; Element 13: further comprising: an insulated container with a heater, a cooler, or both and that contains the multi-layer composite synthetic test bed; and Element 14: wherein the multi-layer composite synthetic test bed is designed with the layers that mimic a rock lithology in a subterranean formation.

By way of non-limiting example, exemplary combinations applicable to Embodiment C include: Element 10 in combination with Element 11; Element 11 in combination with Element 12; Element 12 in combination with Element 13; Element 13 in combination with Element 14; and two or more of the foregoing in combination.

Unless otherwise indicated, all numbers expressing quantities of ingredients, properties such as molecular weight, reaction conditions, and so forth, used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

EXAMPLES

To demonstrate that MLC-STBs can be made with varying structure and composition, several synthetic test beds were prepared using three materials: CALIBRE 200-6 (PC, available from Styron LLC), PLEXIGLAS V790 (PMMA, available from Arkema, Inc.), and LUSTRAN SAN-SPARKLE (styrene acrylonitrile (SAN), available from Ineos Olefins and Polymers). Table 1 provides the properties of the materials.

TABLE 1

| Material | PC | PMMA | SAN |
|---|---|---|---|
| Density$^a$ (g/cm$^3$) | 1.2 | 1.19 | 1.07 |
| Melt Flow Rate (g/10 min) | 6$^b$ | 8$^c$ | 12$^c$ |
| Tensile Modulus (MPa) | 2410$^e$ | 3103$^d$ | 3200$^d$ |
| Yield Stress (MPa) | 60$^d$ | n/a | n/a |
| Tensile Strength at Break (MPa) | 72.4$^d$ | 68.9$^d$ | 62$^d$ |
| Tensile Elongation (%) | 150$^d$ | 5$^d$ | n/a |

$^a$ASTM D792
$^b$ASTM D1238 (300° C./1.2 kg)
$^c$ASTM D1238 (230° C./3.8 kg)
$^d$ASTM D638
$^e$ASTM D790
n/a—not available

TABLE 2

| Sample | Composition | Description | Layers |
|---|---|---|---|
| C-1 | PMMA | polymethylmethacrylate | 1 |
| C-2 | SAN | styrene acrylonitrile | 1 |
| C-3 | PC | polycarbonate | 1 |

TABLE 3

| | Layers | | Composition | | Layer Thickness (mm) | |
|---|---|---|---|---|---|---|
| Sample | A (vol %) | B (vol %) | A | B | A | B |
| I | 50 | 50 | PC | PMMA | 10 | 10 |
| II | 50 | 50 | PC | PMMA | 1 | 1 |
| III | 50 | 50 | PC | SAN | 10 | 10 |
| IV | 50 | 50 | PC | SAN | 1 | 1 |
| V | 50 | 50 | PMMA | SAN | 10 | 10 |
| VI | 50 | 50 | PMMA | SAN | 1 | 1 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   determining materials of construction that correlate to properties of a selected rock lithology for a corresponding subterranean formation;
   forming a multi-layer composite synthetic test bed comprising a plurality of layers in an alternating configuration that corresponds to the selected rock lithology using the materials of construction, the multi-layer composite synthetic test bed being configured to fracture in a manner that corresponds to downhole fracturing in the corresponding subterranean formation based on the selected rock lithology, the materials of construction comprising at least one polymer and an additive;
   introducing a fracturing fluid into the multi-layer composite synthetic test bed at a pressure and a flow rate sufficient to create a fracture network therein;
   obtaining imaging data indicating a fracture propagation in the fracture network from one or more sensor devices coupled to the multi-layer composite synthetic test bed; and
   producing synthetic fracture data based on the obtained imaging data.

2. The method of claim 1, further comprising: inputting the synthetic fracture data into a fracture model.

3. The method of claim 1, further comprising: using the fracture model to design a fracturing operation of the corresponding subterranean formation.

4. The method of claim 1, wherein producing the synthetic fracture data comprises mapping the fracture network, and wherein the synthetic fracture data comprises a map of the fracture network.

5. The method of claim 1, further comprising: adjusting a temperature and a pressure of the multi-layer composite synthetic test bed.

6. The method of claim 1, further comprising: correlating the synthetic fracture data to actual fracture data of the corresponding subterranean formation to produce correlated fracture data that maps the synthetic fracture data to fracture parameters of the actual fracture data.

7. The method of claim 6, further comprising: inputting the correlated fracture data into the fracture model.

8. A method comprising:
   determining materials of construction that correlate to properties of a selected rock lithology for a corresponding subterranean formation;
   forming a multi-layer composite synthetic test bed comprising a plurality of layers in an alternating configuration that corresponds to the selected rock lithology using the materials of construction, the multi-layer composite synthetic test bed being configured to fracture in a manner that corresponds to downhole fracturing in the corresponding subterranean formation based on the selected rock lithology, the materials of construction comprising at least one polymer and an additive;
   introducing a fracturing fluid into the multi-layer composite synthetic test bed at a pressure and a flow rate sufficient to create a fracture network therein;
   analyzing the fracture network by at least one of (1), (2), or (3) using imaging data indicating a fracture propagation in the fracture network to produce a corresponding synthetic fracture data of (A), (B), or (C):
   (1) mapping the fracture network to produce (A) a map of the fracture network;
   (2) analyzing a birefringence in a material of the multi-layer composite synthetic test bed surrounding at least a portion of the fracture network to produce (B) a stress of the material associated with the birefringence; and
   (3) viewing at least a portion of the fracture network at an intersection of two layers of the multi-layer composite synthetic test bed to produce (C) a geometry of the portion of the fracture network at the intersection of the two layers; and
   correlating the synthetic fracture data to actual fracture data of the corresponding subterranean formation to produce correlated fracture data.

9. The method of claim 8, further comprising: inputting the correlated fracture data into a fracture model.

10. The method of claim 8, further comprising: using the fracture model to design a fracturing operation of the corresponding subterranean formation.

11. A system comprising:
    a multi-layer composite synthetic test bed comprising a plurality of layers in an alternating configuration that corresponds to a selected rock lithology for a corresponding subterranean formation using materials of construction that correlate to properties of the selected rock lithology, the multi-layer composite synthetic test bed being configured to fracture in a manner that corresponds to downhole fracturing in the corresponding subterranean formation based on the selected rock lithology, the materials of construction comprising at least one polymer and an additive; and
    a processor configured to:
      obtain imaging data indicating a fracture propagation in a fracture network from one or more sensor devices coupled to the multi-layer composite synthetic test bed;
      produce synthetic fracture data based on the obtained imaging data, the fracture network being created based on a fracturing fluid introduced into the multi-layer composite synthetic test bed at a pressure and a flow rate sufficient to create the fracture network therein; and
      correlate the synthetic fracture data to actual fracture data of the corresponding subterranean formation to produce correlated fracture data.

12. The system of claim 11, wherein the processor is further configured to input the synthetic fracture data into a fracture model.

13. The system of claim 11, wherein the processor is further configured to utilize the fracture model to design a fracturing operation of a subterranean formation.

14. The system of claim 11, wherein the processor is further configured to map the fracture network for analyzing the fracture network, and wherein the synthetic fracture data comprises a map of the fracture network.

15. The system of claim 11, wherein the processor is further configured to correlate the synthetic fracture data with formation fracture data, the formation fracture data being actual fracture data of the corresponding subterranean formation.

16. The system of claim 11, wherein the processor is further configured to input the correlated fracture data into the fracture model.

17. The system of claim 11, wherein the processor is further configured to adjust a temperature and a pressure of the multi-layer composite synthetic test bed.

* * * * *